(No Model.) 2 Sheets—Sheet 1.

A. ONSLOW.
PENDULUM SCALE.

No. 281,292. Patented July 17, 1883.

WITNESSES.
H. F. Parker
Willy J. E. Schultz

INVENTOR.
Adolphe Onslow.
By his Attorney,
A. v. Briesen (No Model.)  2 Sheets—Sheet 2.

A. ONSLOW.
PENDULUM SCALE.

No. 281,292. Patented July 17, 1883.

WITNESSES.
H. F. Parker
Willy J. E. Schultz

INVENTOR.
Adolphe Onslow
by his Attorney,
A. v. Briesen

UNITED STATES PATENT OFFICE.

ADOLPHE ONSLOW, OF JERSEY CITY, NEW JERSEY.

PENDULUM-SCALE.

SPECIFICATION forming part of Letters Patent No. 281,292, dated July 17, 1883.

Application filed September 13, 1880. (No model.)

*To all whom it may concern:*

Be it known that I, ADOLPHE ONSLOW, of Jersey City, in the county of Hudson and State of New Jersey, have invented an Improved Weight-Indicating Scale, of which the following is a specification.

This invention relates to a new scale which, with the assistance of a permanent weight, indicates by a movable pointer the weight of the article suspended from or placed upon it. The improved scale is to take the place of the ordinary spring-scale, the permanent weight the place of the ordinary spring in such scales.

My invention consists of several features of novel construction and combination, which are hereinafter more fully described.

Figure 1:
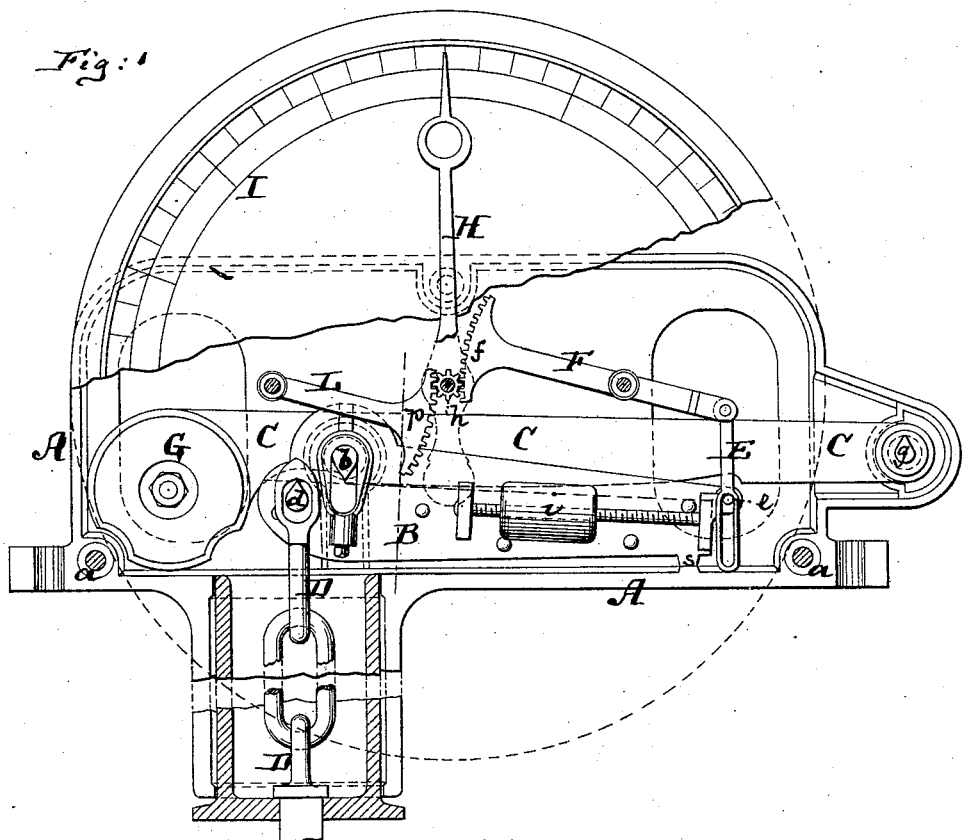
Figure 2:
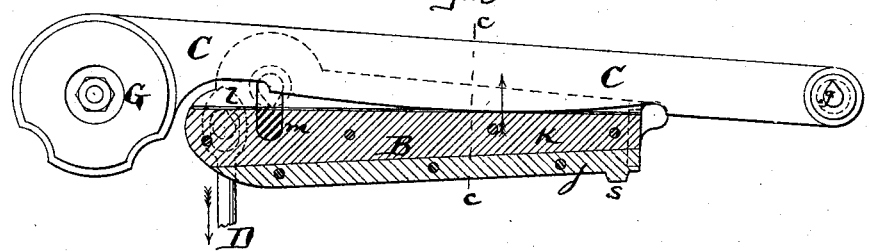
Figure 3:
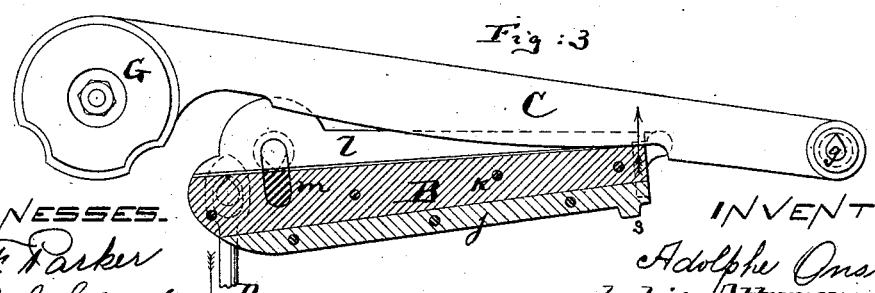
Figure 4:
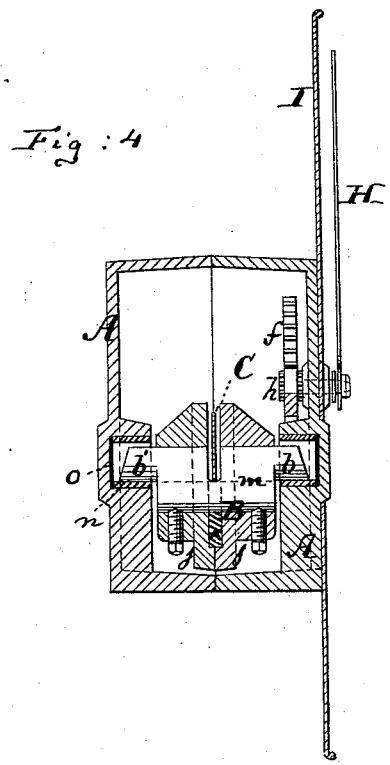
Figure 5:
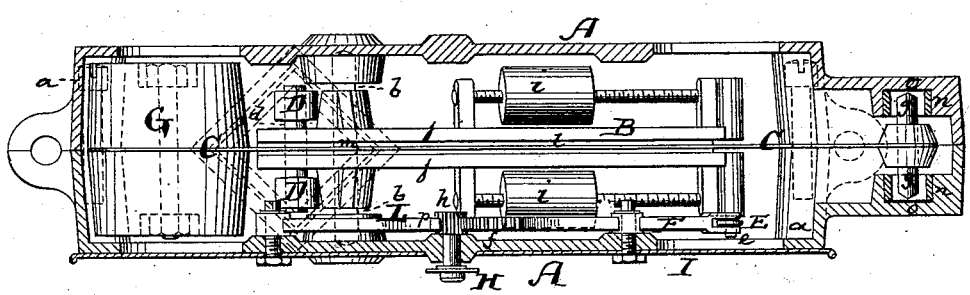

In the accompanying drawings, Figure 1 is a face view, partly in section, of my improved scale. Figs. 2 and 3 are sectional side views of the two main operating-levers. Fig. 4 is a vertical cross-section of the scale; Fig. 5, a horizontal section thereof, and Fig. 6 a detail cross-section on the line $c\ c$, Fig. 2.

Figure 6:
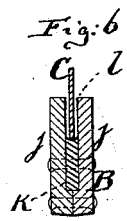

A represents the housing of the scale, which may be made in two parts, bolted together by bolts $a$, or of other suitable construction. Within this housing are pivoted the main levers B and C. The lever B, which is preferably of the peculiar construction hereinafter described, hangs on knife-edge pivots $b$, and carries on its short arm, on knife-edge pivots $d$, the chain D, from which the article to be weighed is suspended. The long arm of the lever B has a projecting pin, $e$, which passes through the slot of a strap or rod, E, that is suspended from a lever, F, said lever F carrying a toothed segment, $f$, as shown in Fig. 1. The lever C is at $g$ pivoted in the housing A and bears upon the lever B, (see Figs. 2 and 3,) and carries at its free end the permanent weight G. The toothed segment $f$ matches into a pinion, $h$, the arbor of which carries the pointer H of the scale, said pointer moving over a graduated scale or dial-plate, I. The lever B is provided at or near its sides with adjusting-weights $i$, for the purpose of properly regulating the scale and balancing the lever B. The construction of the lever B is preferably the following: Two cheek-pieces, $j\ j$, of cast metal, carry between them and support on lower ribs a steel plate, $k$. (See Fig. 6.) The upper edge of the steel plate $k$ is hollow or rounded, as indicated in Fig. 6. The parts $j\ j$ and $k$ are properly united by suitable rivets. The steel plate $k$ does not extend up as high as the cheek-pieces $j$, so that thus a groove, $l$, is formed in the upper edge of the lever B, for the reception of the lever C, which also is a steel plate by preference, and which has its lower edge rounded, as shown in Figs. 2 and 3, so that, in reality, at any one time only one point of contact will be between the lever C and the lever B, the latter being tangential to the former. The pivots $b$ of the lever B are by preference formed at the ends of a yoke-shaped bar, $m$, (see Figs. 4, 2, and 3,) which is secured transversely in the lever B, as clearly shown, and which is grooved at the upper side in continuation and completion of the groove $l$, as shown. The several knife-edge pivots of the scale, where they have their support in the frame or housing A, I prefer to rest on the inner peripheries of steel tubes or sockets $n$, which are fitted in corresponding recesses of the housing, as shown in Figs. 4 and 5, and which can be turned if worn at any one point to furnish fresh concave bearings. Steel plates $o$ should be placed against the ends of the tubes $n$, to prevent undue friction at the ends of the knife-edge pivots. The pinion $h$ meshes also into a toothed segment, $p$, which is affixed to a lever, L, that is hung in the housing; but the segments $f$ and $p$ are engaged into opposite sides of the pinion, as shown in Fig. 1, so that when one of said segments is up the other is down, and vice versa. In its unloaded position the lever B rests on a suitable stop, $s$.

The operation of the scale is as follows: When the load is placed on the scale-platform, or otherwise connected with the chain, the short end or arm of the lever B is pulled down and its long arm is elevated, (see Fig. 3,) and this long arm in turn raises the lever C by contact with the curved lower edge of the same until said lever C, with its weight G, reaches the requisite position for balancing the load, when, of course, further ascent of the weighted end of the lever C will cease. The upward movement of the long arm of the lever B causes the pin $e$ to lift the rod or strap E, and thereby move the lever F and its segment $f$ and the pointer H, the motion of said pointer being in conformity with the movement of the lever B, so that the pointer will correctly indicate the weight of the load. The sectional gear or segment $p$ forms a counter-balance to the segment $f$, and prevents the pinion $h$ from leaving the segment $f$ and pointer from gaining lost motion or whirling under a sudden influence. The slot in the rod $e$ allows the pointer to right itself after the lever B descends to its normal position, when the load is taken away, and prevents the descent of the lever B from suddenly moving the pointer, and thereby injuring the mechanism. In other words, as soon as the load is taken off the platform the momentum of the highly-sped pointer, if pulled down by the sudden descent of the lever B, might break the gearing; but by means of the slot in the strap $e$ the descent of the lever B does not positively affect the position of the pointer other than to enable the pointer to right itself. To this end the pointer is balanced, or the levers F and L are properly balanced, so that the pointer will always assume the zero position when there is no load on the platform or chain D.

I claim—

1. In a scale, the combination of the lever B, from one end of which the load-carrying link or platform is suspended, the other end of which connects with the pointer, as described, with the lever C, placed on top of said lever B and carrying only the permanent weight G, substantially as herein shown and described.

2. The lever B, constructed of the pieces $j\ j$ and $k$, in combination with the yoke-shaped cross-piece $m$, carrying the pivots $b$, substantially as described.

3. The combination of the load-carrying lever B and mechanism, substantially as described, for connecting the same in manner stated, with the pointer H, with the permanent-weight-carrying lever C, that rests upon the lever B, and with the adjusting-weights $i$ on said lever B, substantially as shown and described.

4. The lever B, carrying the load at D, and provided with pin $e$, in combination with the slotted strap or rod E, lever F, and pointer-moving segment $f$, substantially as described, all arranged so that the lever B, when loaded, will move pointer, but will leave the pointer to right itself when unloaded, substantially as specified.

5. The combination of the pointer H and its pinion $h$ with the moving-segment $f$ and balancing-segment $p$, substantially as described.

6. The combination of the tube $n$, which is capable of being revolved on its support, with the knife-edge pivot $b$ of a scale, said pivot resting on the concave inner periphery of said tube, substantially as specified.

7. The combination of the tube $n$ and end plate, $o$, with the housing A, and with the knife-edge pivot $b$ of the lever of a scale, said pivot resting on the concave inner periphery of said tube, substantially as described.

ADOLPHE ONSLOW.

Witnesses:
WILLY G. E. SCHULTZ,
HARRY M. TURK.